Patented Feb. 7, 1933

1,896,141

UNITED STATES PATENT OFFICE

ISIDOR KITSÉE, OF PHILADELPHIA, PENNSYLVANIA, ASSIGNOR TO MINERALITE CORPORATION, OF PHILADELPHIA, PENNSYLVANIA, A CORPORATION OF PENNSYLVANIA

PROTECTING METALLIC SURFACES OF REFRIGERATORS FROM SULPHUR COMPOUNDS

No Drawing.    Application filed March 28, 1930.   Serial No. 439,860.

My invention relates to an improvement in protecting metallic surfaces of refrigerators from sulphur compounds.

It is well understood that today the inner cavitas of refrigerators are provided with the material known as insulators for heat. Of all such material mineral wool from slag or natural rock is undoubtedly considered the best, were it not that the same carries a slight amount of sulphur compound.

According to the best authority, Bureau of Mines, circular #6,142, June 1929 the mineral wool produced from slag, called also slag wool, contains ½ of 1% sulphur and was never entirely eliminated. According to this authority, even the small amount of sulphur when present has a tendency to corrode the metal with which it comes in contact, directly or indirectly. The same authority also states as follows: Since rock wool also is likely to contain this element, such wool might be objected to on the same grounds.

This ½ of 1% was, according to the same authority, never extracted.

It is the aim of my invention to safeguard or protect the surface of the metals from this injurious effect.

I have found that if the surface of the metal is coated with a silicate of sodium $Na_2SiO_2 + aq.$, either by brushing, spraying or otherwise, and dried; then the slight amount of sulphur compound carried by the mineral wool will not injuriously effect the metallic surface. Generally, some of the cavitas require about one pound of mineral wool, either in the form of blocks or, what I greatly prefer, loosely placed in said cavitas. Tests have proven that the dried silicate of sodium is in reality a chemical barrier against the action of the sulphur compound.

Where a multitude of pounds of the wool has to be placed in a very narrow but long and broad space, then it is best to put a second or third coat when the underlying coat is dried. Where this procedure is inconvenient, then it is advised to intermix the wool with a compound of alkali base such for instance as a bicarbonate of soda. Should the wool be slightly moistened then it will adhere strongly and permanently to the coated surface.

Having now described my invention, what I claim as new and desire to secure by Letters Patent, is:

1. The method of safeguarding the surface of metals in refrigerators from the action of sulphur compounds in mineral wool which consists in placing a chemical barrier such as silicate of sodium between said compound and the metallic surface.

2. In combination with the material known as insulator for heat placed in one or more cavitas of refrigerators means to safeguard the metallic surfaces against the injurious effect of sulphur or its compound carried by said insulator, said means comprising a silicate of sodium forming a mechanical unit with the surface of said metal.

3. In combination with a mineral wool used as an insulator for heat in refrigerators, a sodium silicate as a coat for the metallic surfaces with which said mineral wool may contact.

4. The method of safeguarding the metallic surfaces of refrigerators against chemicals carried by the mineral wool used as heat insulators which consists therein that the surfaces of the metal are provided with a coating of sodium silicate.

In testimony whereof I affix my signature.

ISIDOR KITSÉE.